UNITED STATES PATENT OFFICE.

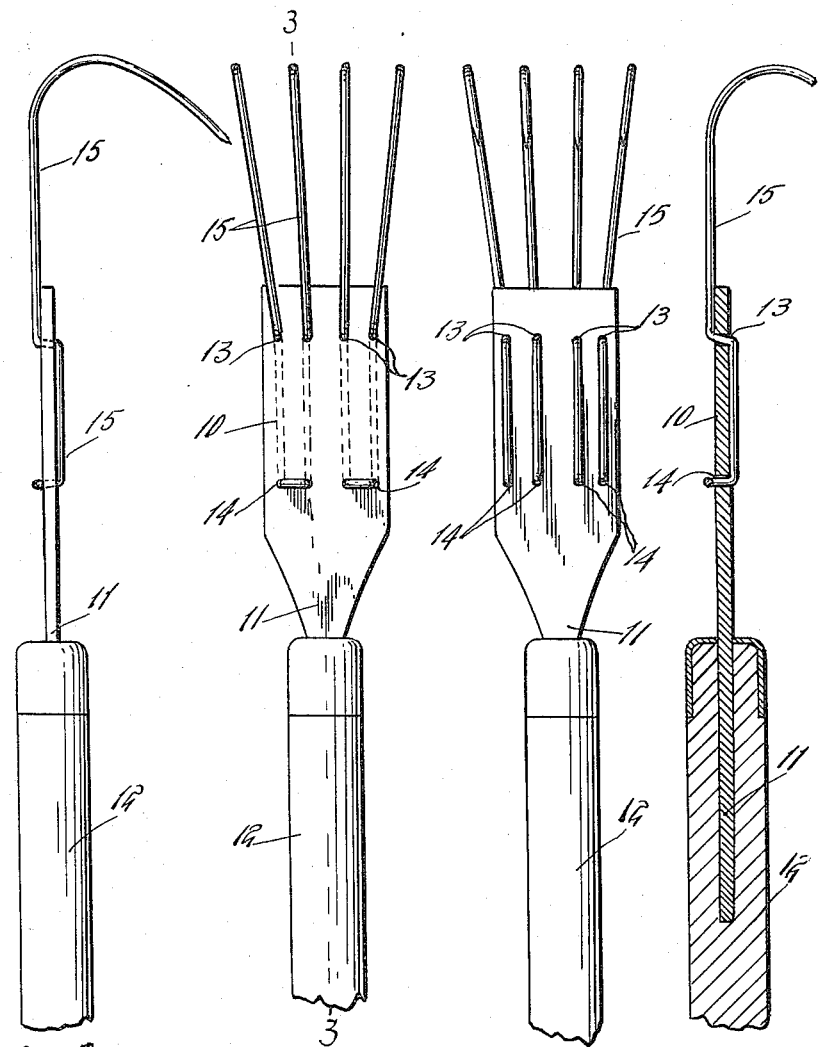

CHARLES S. STEIN, OF HILLSBORO, IOWA.

AGRICULTURAL IMPLEMENT.

1,170,698.     Specification of Letters Patent.     Patented Feb. 8, 1916.

Application filed October 12, 1915. Serial No. 55,460.

*To all whom it may concern:*

Be it known that I, CHARLES S. STEIN, a citizen of the United States, residing at Hillsboro, in the county of Henry, State of Iowa, have invented certain new and useful Improvements in Agricultural Implements; and I do hereby declare the following to be a full, clear, and exact description of the invention, such as will enable others skilled in the art to which it appertains to make and use the same.

This invention relates to improvements in agricultural implements and particularly to hand implements which are used in connection with a cultivator when cultivating the soil around standing plants.

The principal object of the invention is to provide a simple and cheap implement by means of which the leaves of the plants can be lifted from the loose soil thrown on them by the cultivator shovels, and thus be saved for fruit bearing.

Other objects and advantages will be apparent from the following description when taken in connection with the accompanying drawing.

In the drawing: Figure 1 is a side elevation of a tool made in accordance with my invention; Fig. 2 is a top plan view; Fig. 3 is a longitudinal section on the line 3—3 of Fig. 2; and Fig. 4 is a bottom plan view.

Referring particularly to the accompanying drawing, 10 represents the body portion of the implement which is preferably rectangular in outline and of suitable thickness. One end of this body is formed with a shank 11 driven into a suitable handle 12. Formed vertically through the body 10, respectively adjacent the outer and inner ends thereof are the two transverse rows of openings 13 and 14. Tines 15 are carried by the head, and consist of substantially U-shaped wires, the arms of which are passed through two of the openings 14 from the upper side of the body and then passed upwardly through a pair of the openings 13 from whence they are extended from the end of the body and bent downwardly and inwardly to form curved fingers.

When a cultivator is driven down between the rows of standing plants, particularly corn, the shovels of the cultivator throw the soil so as to cover some of the plants. If left this way the plants will die thus constituting a loss to the farmer. Sticks and other like implements have been used heretofore for raising the plants or lower leaves up from the soil. These have all proven inadequate and unsatisfactory, as well as harmful to the plant.

It is the particular object of the present invention to provide a tool which the farmer can use from the cultivator seat and easily and effectively lift the covered plants above the soil thrown by the cultivator shovels.

It will be noted that the device is of such construction that it is only necessary to drag the teeth of the device through the loose soil with an upward motion to lift the plant above the soil. This will not in any way injure the plant, and the time required to manipulate the tool considerably less than with the devices for this purpose used heretofore.

What is claimed is:

An agricultural implement comprising a body portion having a plurality of transverse openings, a handle carried by the body portion and a plurality of pairs of tines extending downwardly through one row of openings and upwardly through the other row of openings and having their end portions extended beyond the body and bent to form curved fingers.

In testimony whereof, I affix my signature, in the presence of two witnesses.

CHARLES S. STEIN.

Witnesses:
WILLIAM NAUMAN,
STEPHEN A. HUTTON.

Copies of this patent may be obtained for five cents each, by addressing the "Commissioner of Patents, Washington, D. C."